June 3, 1952      E. M. TUCKER      2,598,863
DRIVE AXLE MOUNTED FOR SWINGING AND ROCKING MOTION
Filed Dec. 17, 1948      3 Sheets-Sheet 2
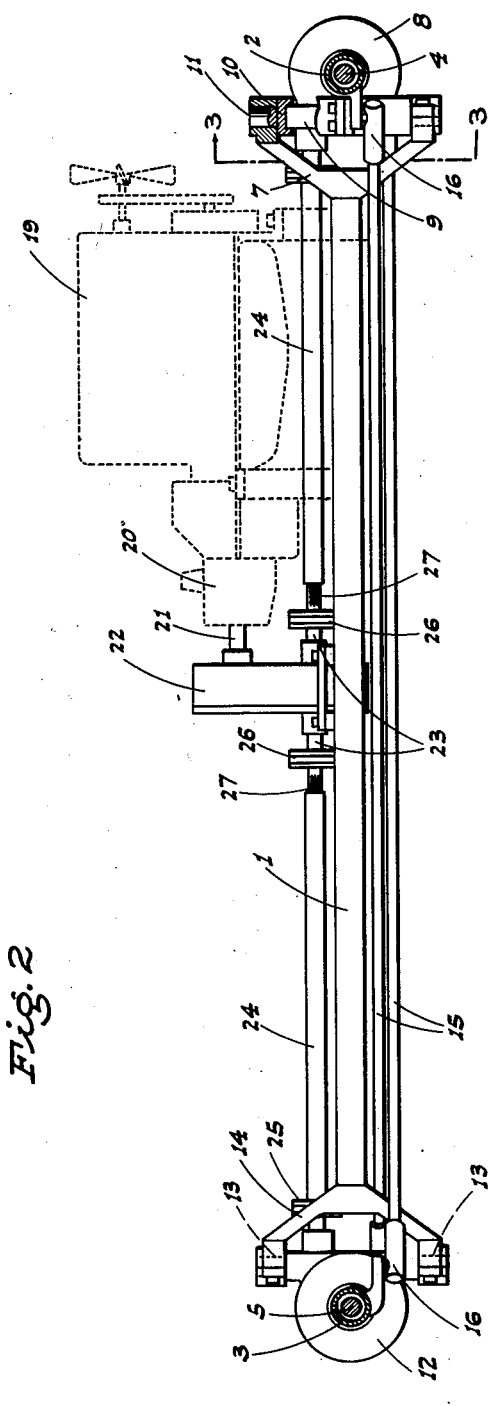
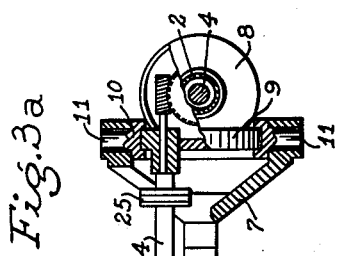
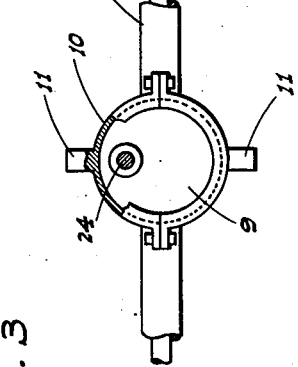
INVENTOR.
*E. M. Tucker*
BY
*ATTYS*

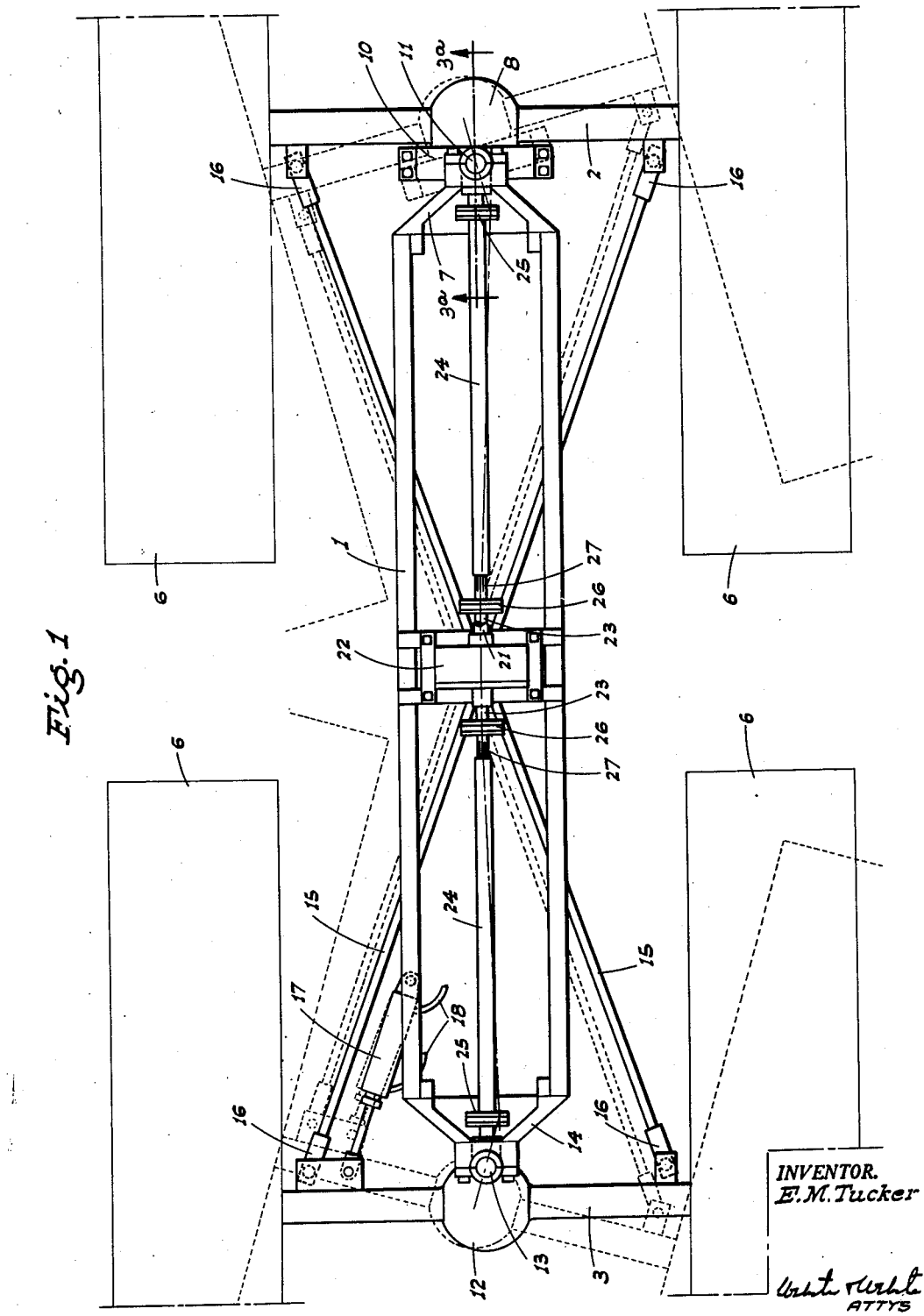

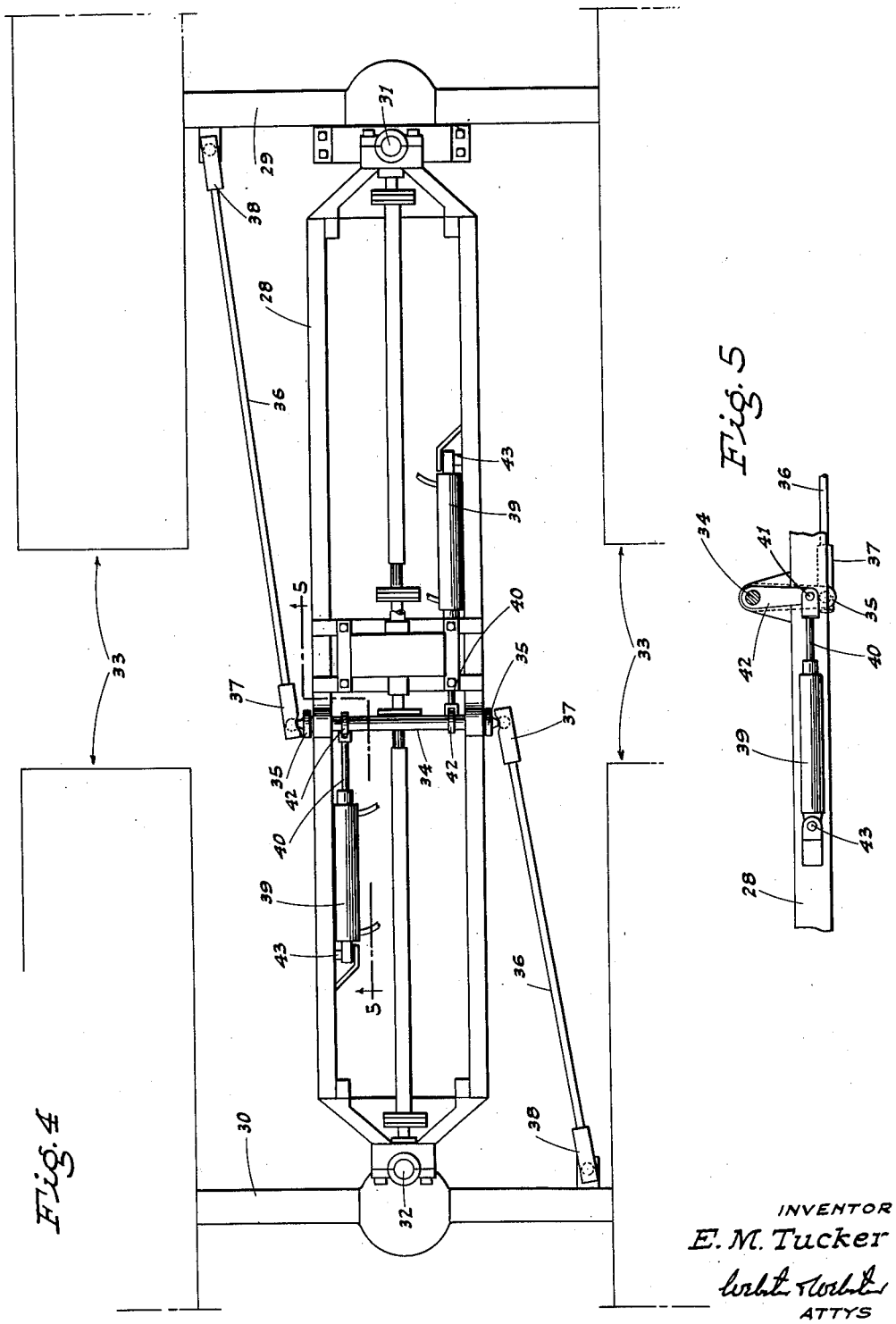

Patented June 3, 1952

2,598,863

UNITED STATES PATENT OFFICE 2,598,863

DRIVE AXLE MOUNTED FOR SWINGING AND ROCKING MOTION

Emmitt M. Tucker, Medford, Oreg.

Application December 17, 1948, Serial No. 65,932

2 Claims. (Cl. 180—50)

This invention is directed to, and it is an object to provide, a novel four-wheel drive and steer vehicle chassis; such chassis, while especially designed for endless track type snow tractors, being adaptable to automobiles and trucks.

Another object of the invention is to provide a vehicle chassis which includes a novel mounting and drive mechanism for the endless track units or wheels of said chassis; such mount also providing four-wheel steering, with resultant short turning radius.

A further object of the invention is to provide a vehicle chassis, as above, wherein the front and rear axles are swingable horizontally about an intermediate vertical pivot, and such axles are interconnected for simultaneous but reverse motion so that when the front endless tracks or wheels steer in one direction, the rear ones steer oppositely whereby the turning radius is extremely short.

An additional object of the invention is to provide a vehicle chassis, as in the preceding paragraph, wherein each pivotally mounted axle includes a differential adjacent the pivotal axis, and a universal drive shaft leads to each differential to impart a drive thereto regardless of the steering position of said axle.

It is also an object of the invention to provide a vehicle chassis wherein four-wheel drive and steer is accomplished without the necessity of employing any universal mount or connection between the endless tracks or wheels and the corresponding axle housings; the present invention employing conventional rigid axles with the endless tracks or wheels fixed thereon.

A further object of the invention is to provide a practical and reliable four-wheel drive and steer vehicle chassis, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view, somewhat diagrammatic, of the novel vehicle chassis.

Fig. 2 is a side elevation of such chassis, partly in section.

Fig. 3 is a fragmentary transverse view on line 3—3 of Fig. 2 showing the mount for the front axle housing.

Fig. 3a is a fragmentary longitudinal section generally on line 3a—3a of Fig. 1.

Fig. 4 is a plan view showing a modified steering arrangement.

Fig. 5 is a cross section on line 5—5 of Fig. 4.

Referring now more particularly to the characters of reference on the drawings, and particularly at present to Figs. 1–3 inclusive, the numeral 1 indicates an elongated rigid main frame extending between a transverse, front axle housing 2, and a transverse, rear axle housing 3.

The front and rear axle housings 2 and 3 include therein front and rear axles 4 and 5, respectively. The axles 4 and 5 are secured, at their outer ends, to endless track units, indicated diagrammatically at 6, and which endless track units provide the supporting and propelling means of the chassis. Endless track units 6 are used when the chassis is embodied in a snow tractor. Wheels would be used instead of the endless track units 6 for automobile or truck use.

At its forward end the main frame 1 is formed with an upstanding, forwardly opening fork 7, and the front axle housing 2 is mounted in connection with such fork for rocking in a transverse vertical plane, as follows:

The front axle housing 2 is formed, intermediate its ends, with a front differential 8 which drives the front axles 4; the case of such differential being provided, at the rear, with a rigid mounting disc 9 disposed with its axis lengthwise of the direction of travel. The rigid mounting disc 9 is turnably carried in an internally channeled ring 10 having opposed vertical trunnions 11 which are turnably mounted in the corresponding ends of the fork 7, as clearly shown in Fig. 2.

With the above arrangement the front axle housing 2 is steerable in a horizontal plane with the trunnions 11 as the axis, and said housing is also rockable in a transverse vertical plane about the axis of the mounting disc 9.

The rear axle housing 3 is mounted in connection with the adjacent end of the main frame 1 for steering in a horizontal plane, as follows:

Said rear axle housing 3 includes, intermediate its ends, a rear differential 12 which drives the rear axles 5; such rear differential 12 being formed with opposed vertical trunnions 13 which are mounted in turnable relation in the ends of an upstanding, rearwardly opening fork 14 on the rear end of the main frame 1. With this arrangement, the rear axle housing 3 can swing or be steered in a horizontal plane.

The front axle housing 2 and rear axle housing 3 are interconnected for simultaneous but opposed steering motion by a pair of intersecting tie rods 15; each tie rod extending from the outer end portion of one axle housing to an opposed outer end portion of the other axle housing. The tie rods 15 are pivotally connected to the axle housings, as at 16. With this arrangement it will be apparent that when one axle housing is swung to steer its endless track units 6 to the right, the other axle housing will swing oppositely to steer its track units 6 to the left; the turning radius of the chassis thus being very short.

Steering motion of the axle housings 2 and 3, in a horizontal plane, is accomplished by a double-acting, fluid pressure power cylinder 17 pivotally connected, in diagonal relation, between the rear axle housing 3 and the main frame 1, in the manner shown in Fig. 1. The power cylinder 17 is adapted to be actuated in either direction by means of a fluid pressure control system, indicated in part at 18, but which system includes a control valve (not shown) accessible to the operator of the vehicle.

The front differential 8 and the rear differential 12 are driven, in any steering position of the axle housings 2 and 3, as follows:

The engine, indicated at 19, is mounted on the main frame 1 adjacent one end thereof; such engine 19 including a transmission 20 having a drive shaft 21 which actuates a gear box or transfer case 22; the latter being mounted on the frame substantially centrally of its ends.

Adjacent the lower end thereof the gear box 22 includes longitudinal output shafts 23 which project from opposite sides of said gear box lengthwise of the direction of travel.

The output shafts 23 are each connected to a corresponding universal drive shaft 24, one of said shafts extending forwardly and connecting in driving relation to the front differential 8, as shown in Fig. 3a, while the other of said shafts extends rearwardly and connects in driving relation to the rear differential 12.

Each universal drive shaft 24 includes universal joints 25 and 26, together with a spline connection 27.

The universal drive shafts 24 permit the axle housings 2 and 3 to swing or steer in a horizontal plane without interference with the drive of the corresponding differential, so that a four-wheel drive of the vehicle is maintained regardless of the steering thereof.

The mount for the front axle 2, which mount includes the mounting disc and internally channeled ring 10 for said disc, permits the front axle housing 2 to rock in a transverse vertical plane, as is desirable upon the vehicle traversing uneven ground. This rocking has no restricting effect upon the drive of the front differential 8, for the reason that the corresponding drive shaft 24 enters such differential through the mounting disc 9 and adjacent its axis.

Figs. 4 and 5 illustrate the vehicle chassis as embodying a modified type of steering arrangement.

In this embodiment the main frame is indicated at 28 and is supported, at opposite ends, by a front axle housing 29 and a rear axle housing 30, which axle housings are mounted for horizontal swinging or steering motion by means of trunnion assemblies, indicated generally at 31 and 32, respectively.

As before, the front axle housings 29 and 30 are supported, at their outer ends, by endless track units 33.

The front axle housing 29 and rear axle housing 30 are adapted to be steered, simultaneously but with opposed steering motion, by means of the following arrangement:

A cross shaft 34 is journaled on the main frame 28 intermediate its ends, and exteriorly of the adjacent sides of the main frame 28 the cross shaft 34 includes fixed dependent radial levers 35.

Longitudinal steering rods 36 are connected at their inner ends by steering knuckles 37 to the lower ends of corresponding levers 35. From the steering knuckles 37 the steering rods 36 extend lengthwise, in opposite directions, and in outwardly diagonal relation, to connection with corresponding ones of the axle housings 29 and 30 by means of steering knuckles 38.

A pair of longitudinally disposed, fluid pressure actuated power cylinders 39, of double acting type, are affixed to opposite sides of the main frame 28, and on opposite sides of the cross shaft 34.

Such power cylinders 39 are of double acting type, and their piston rods 40 extend longitudinally inwardly to pivotal connection, as at 41, to corresponding radial, actuating levers 42 on the cross shaft 34. At their outer ends the power cylinders 39 are pivotally connected to the main frame, as at 43.

The power cylinders 39 are simultaneously actuated, in push-pull relation with respect to the levers 42, through the medium of a common, fluid pressure control system (not shown), but which system is valve controlled by the operator of the vehicle.

Upon simultaneous reversible operation of the power cylinders 39, one steering rod 36 is pulled inwardly while the other is pushed outwardly in a longitudinal direction, causing opposed steering motion of the front and rear axle housings 29 and 30, respectively.

The described four-wheel drive and steer vehicle chassis is especially useful for endless track-type snow tractors, such as are commercialized under the trade-mark "Sno-Cat." However, it is obvious that the described chassis may also be very effective when adapted to a truck or automobile.

The chassis is of rugged and reliable construction, and will provide long and reliable service.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a four-wheel drive vehicle chassis having longitudinal side frames and a front wheel axle housing spaced longitudinally beyond the forward end of said side frames and which includes axle shafts, a differential connecting said axle shafts and a central housing for said differential, a mount for connecting said axle housing to said side frames comprising vertically alined trunnions, means including a disc mounting the trunnions in connection with the differential housing at the top and bottom thereof, forwardly projecting fork members rigid with the frames at their corresponding end and including members converging laterally but diverging vertically from the side frames, and laterally split sleeves carried by the upper and lower ends of said fork members, said sleeves turnably embracing the trunnions; a drive shaft positioned intermediate said frame members, said drive shaft projecting rotatably through said disc from between the frames and into the differential housing and drivingly engaging said differential to thereby drive said axle shafts.

2. A structure as in claim 1 in which said trunnion mounting means for the front axle of the chassis comprises said disc fixed on a horizontal axis on the rear side of the differential housing, and a ring embracing and relatively turnably mounted on the disc, the trunnions being fixed on said ring.

EMMITT M. TUCKER.

REFERENCES CITED

The following references are of record in the file of this patent:

UNITED STATES PATENTS

| Number | Name | Date |
|---|---|---|
| 893,107 | Snow | July 14, 1908 |
| 971,471 | Peterson et al. | Sept. 27, 1910 |
| 1,066,072 | Bouas | July 1, 1913 |
| 1,240,650 | Beatty | Sept. 18, 1917 |
| 1,274,434 | Morton | Aug. 6, 1918 |
| 1,427,362 | Cozzens | Aug. 29, 1922 |
| 1,457,692 | Carter | June 5, 1923 |
| 2,400,803 | Barnhart | May 21, 1946 |

FOREIGN PATENTS

| Number | Country | Date |
|---|---|---|
| 260,785 | Great Britain | Nov. 11, 1926 |
| 513,099 | France | Oct. 28, 1920 |